United States Patent
Ikebukuro (10) Patent No.: US 9,635,844 B2
(45) Date of Patent: May 2, 2017

(54) REEL BODY OF A DUAL-BEARING REEL

(71) Applicant: Shimano Inc., Sakai, Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 141 days.

(21) Appl. No.: 14/533,685

(22) Filed: Nov. 5, 2014

(65) Prior Publication Data

US 2015/0208630 A1    Jul. 30, 2015

(30) Foreign Application Priority Data

Jan. 28, 2014 (JP) .................................. 2014-13592

(51) Int. Cl.
*A01K 89/01*    (2006.01)
*A01K 89/015*    (2006.01)

(52) U.S. Cl.
CPC ............... *A01K 89/01925* (2015.05)

(58) Field of Classification Search
CPC .............. A01K 89/015; A01K 89/0192; A01K 89/01925
See application file for complete search history.

(56) References Cited

U.S. PATENT DOCUMENTS

| | | | | |
|---|---|---|---|---|
| 3,451,638 A * | 6/1969 | Moat | ........... | A01K 89/015 242/271 |
| 5,131,596 A * | 7/1992 | Sato | ........... | A01K 89/015 242/279 |
| 5,150,854 A * | 9/1992 | Noda | ........... | A01K 89/015 242/310 |
| 5,480,102 A * | 1/1996 | Sato | ........... | A01K 89/015 242/310 |
| 5,489,070 A * | 2/1996 | Puryear | ........... | A01K 89/015 242/261 |
| 5,560,562 A * | 10/1996 | Hartmann | ........... | A01K 89/015 192/111.1 |
| 5,577,680 A * | 11/1996 | Ikuta | ........... | A01K 89/015 242/288 |
| 5,799,892 A * | 9/1998 | Sato | ........... | A01K 89/015 242/288 |
| 5,996,919 A * | 12/1999 | Murayama | ........... | A01K 89/015 242/261 |
| 6,126,103 A * | 10/2000 | Nanbu | ........... | A01K 89/015 242/223 |
| 6,315,228 B1 * | 11/2001 | Sato | ........... | A01K 89/015 242/261 |
| 6,412,720 B1 * | 7/2002 | Ikuta | ........... | A01K 89/015 242/269 |

(Continued)

FOREIGN PATENT DOCUMENTS

JP    2003-235414 A    8/2003

*Primary Examiner* — Emmanuel M Marcelo
(74) *Attorney, Agent, or Firm* — Global IP Counselors, LLP (57) ABSTRACT

A reel body includes a first body portion, a second body portion, first connecting portion, a second connecting portion, a fixing portion, and a fishing rod mounting portion. The first and second connecting portions connect the first body portion and the second body portion. The fixing portion is disposed on the first connecting portion. The fixing portion protrudes from the outer peripheral edge of the second body portion from the side view. The fishing rod mounting portion is fixed to the fixing portion.

9 Claims, 7 Drawing Sheets

(56) References Cited

U.S. PATENT DOCUMENTS

| | | | | |
|---|---|---|---|---|
| 6,464,158 | B1* | 10/2002 | Sakurai | A01K 89/006 242/283 |
| 9,185,893 | B1* | 11/2015 | Heaton | A01K 89/0192 |
| 2005/0218256 | A1* | 10/2005 | Ikuta | A01K 89/015 242/288 |
| 2006/0006267 | A1* | 1/2006 | Hirayama | A01K 89/015 242/223 |
| 2007/0114316 | A1* | 5/2007 | Klein | A01K 89/015 242/278 |
| 2008/0173745 | A1* | 7/2008 | Takechi | A01K 89/015 242/321 |
| 2008/0302899 | A1* | 12/2008 | Chang | A01K 89/00 242/241 |
| 2009/0250541 | A1* | 10/2009 | Tsutsumi | A01K 89/015 242/257 |
| 2010/0006689 | A1* | 1/2010 | Ikuta | A01K 89/033 242/306 |
| 2012/0104135 | A1* | 5/2012 | Toma | A01K 89/015 242/227 |

* cited by examiner

REEL BODY OF A DUAL-BEARING REEL

CROSS-REFERENCE TO RELATED APPLICATIONS

This application claims priority to Japanese Patent Application No. 2014-13592, filed on Jan. 28, 2014, the entirety of which is hereby incorporated by reference in its entirety.

BACKGROUND

Field of the Invention

The present invention relates to a reel body of a dual-bearing reel.

Background Information

In general, a dual-bearing reel comprises a reel body that rotatably supports a spool. The reel body comprises first and second body portions, a connecting portion, and a fishing rod mounting portion. The first and the second body portions are coupled by the connecting portion. The fishing rod mounting portion is mounted to the fishing rod. This fishing rod mounting portion is fixed to the connecting portion via a rivet, etc. (refer to Japanese Laid-Open Patent Publication No. 2003-235414).

SUMMARY

When reeling in a fish, a load acts on the fishing rod mounting portion, which is mounted to the fishing rod. As a result, when the distance between the end of the fishing rod mounting portion and the connecting portion is long, it is possible that the fishing rod mounting portion will be bent.

The object of the present invention is to prevent the fishing rod mounting portion from becoming bent.

A reel body for a dual-bearing reel according to one aspect of the present invention casts the fishing line in a forward direction. The reel body comprises a first body portion, a second body portion, a connecting unit, a fixing portion, and a fishing rod mounting portion. The first body portion and the second body portion are disposed to face each other at a prescribed interval. The outer shape of at least one of the first body portion and the second body portion is circular or nearly (substantially) circular from the side view. The connecting unit connects the first body portion and the second body portion. The fixing portion is disposed on the connecting unit. The fixing portion protrudes from the outer peripheral edge of at least one of the first and the second body portions from the side view. The fishing rod mounting portion is configured to be mounted to a fishing rod. The fishing rod mounting portion is fixed to the fixing portion.

According to this configuration, the fixing portion to which the fishing rod mounting portion is fixed is configured to protrude from the outer peripheral edge of at least one of the first and the second body portions. Accordingly, the distance between a fixing device (means) configured to fix the fishing rod mounting portion to the fixing portion and the end of the fishing rod mounting portion can be shortened. As a result, the moment that acts on the fishing rod mounting portion when reeling in a fish, etc., can be reduced; thus, bending of the fishing rod mounting portion can be prevented.

Preferably, the fixing portion protrudes forwardly from the outer peripheral edge of at least one of the first body portion and the second body portion from the side view. A load is more prone to act on the front portion of the fishing rod mounting portion; however, according to this configuration, the distance between the front end portion of the fishing rod mounting portion and the fixing portion can be shortened, and the moment that acts on the front portion of the fishing rod mounting portion can be reduced.

Preferably, the fishing rod mounting portion extends in the longitudinal direction. The connecting unit extends in a direction that intersects with the fishing rod mounting portion. The fixing portion protrudes from the center portion of the connecting unit in the longitudinal direction.

Preferably, the fishing rod mounting portion is fixed to the fixing portion by a rivet.

Preferably, the first body portion is larger in diameter than the second body portion. The fixing portion is positioned inside of the outer peripheral edge of the first body portion and is positioned outside of the outer peripheral edge of the second body portion from the side view. According to this configuration, the fixing portion is positioned inside of the outer peripheral edge of the first body portion, so that machining the first body portion becomes easy.

Preferably, the connecting unit is positioned inside of the outer peripheral edge of the first and the second body portions from the side view.

Preferably, the connecting unit comprises a first connecting portion and a second connecting portion. The first connecting portion and the second connecting portion are disposed at an interval from each other in the longitudinal direction. Additionally, the first connecting portion and the second connecting portion connect the first body portion and the second body portion.

Preferably, the fishing rod mounting portion is fixed to the fixing portion and the second connecting portion.

Preferably, the first and the second connecting portions are positioned inside of the outer peripheral edge of the first and the second body portions from the side view.

Accordingly, in the present invention, bending of the fishing rod mounting portion can be prevented.

BRIEF DESCRIPTION OF THE DRAWINGS

Referring now to the attached drawings which form a part of this original disclosure.

DETAILED DESCRIPTION OF THE EMBODIMENTS

Figure 1:
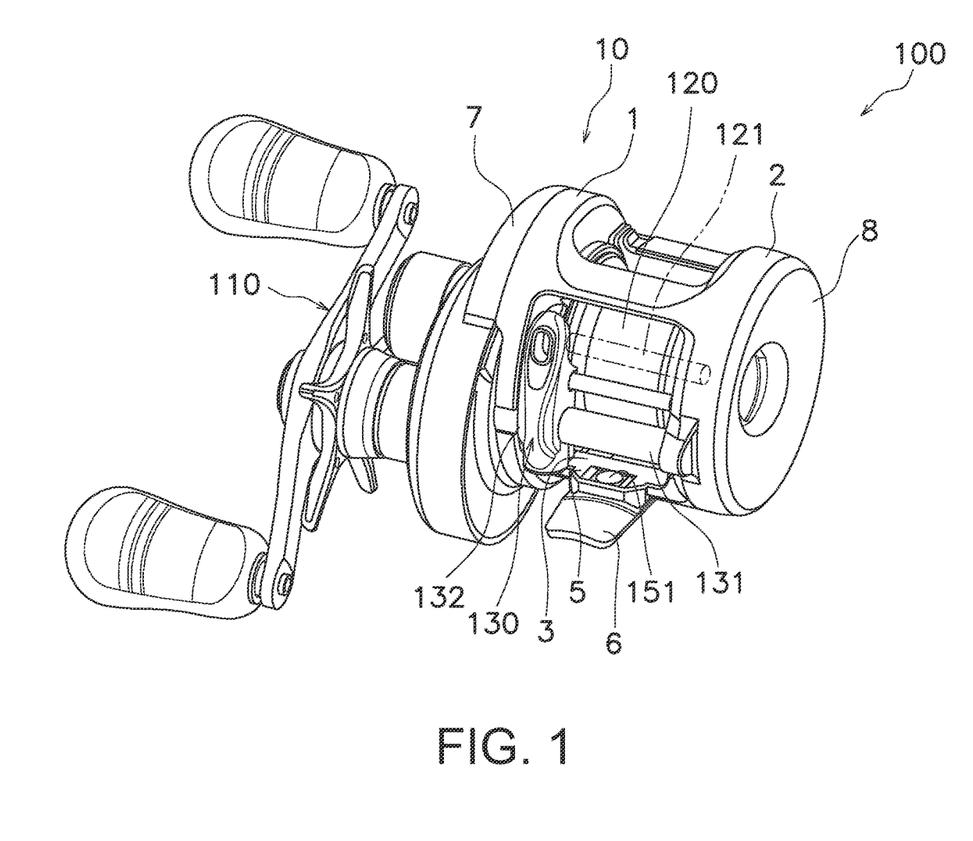
FIG. 1 is a perspective view of a dual-bearing reel.

The embodiments of the reel body of the dual-bearing reel according to the present invention will be explained below with reference to the drawings. FIG. 1 is a perspective view of a dual-bearing reel, and FIG. 2 is a cross-sectional view of the dual-bearing reel.

As shown in FIG. 1, the dual-bearing reel 100 according to the present embodiment casts a fishing line in the forward direction. The dual-bearing reel 100 comprises a reel body 10, a handle 110, a spool. 120, and a level winding mechanism 130. Also, as shown in FIG. 2, the dual-bearing reel 100 further comprises a rotation transmission mechanism 140.

Figure 2:
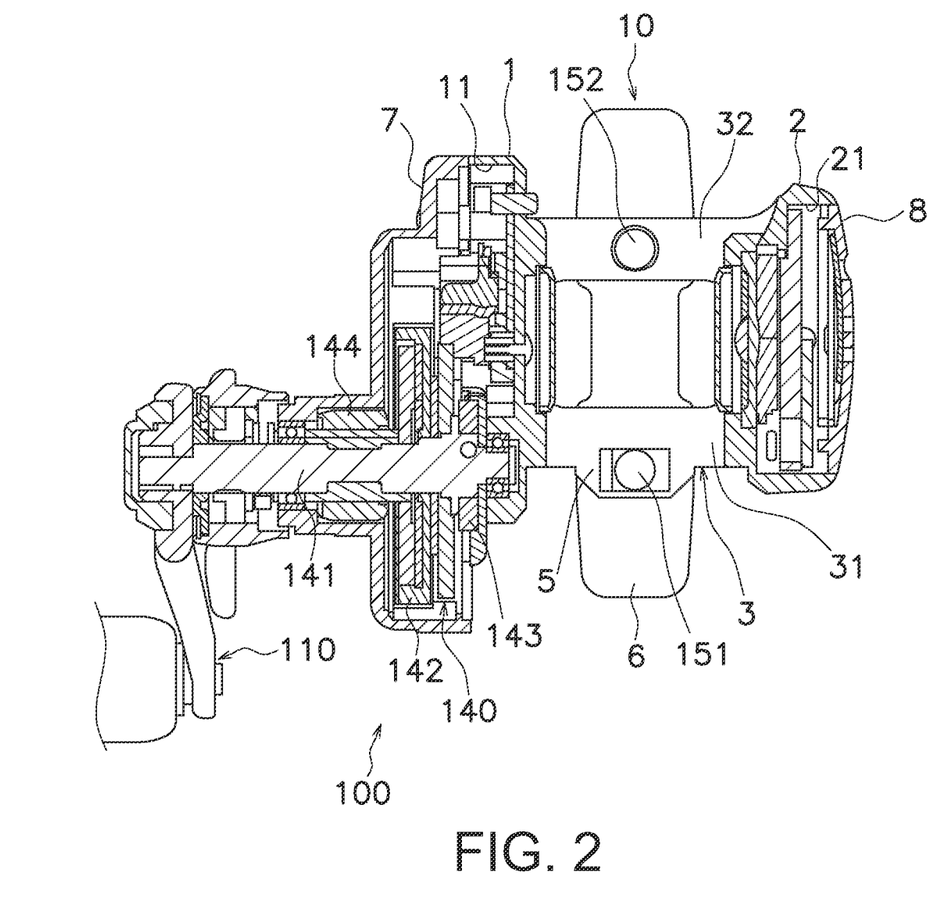
FIG. 2 is a cross-sectional view of the dual-bearing reel.

As shown in FIG. 1 and FIG. 2, the reel body 10 comprises a first body portion 1, a second body portion 2, a connecting unit 3, a fixing portion 5, and a fishing rod mounting portion 6. The reel body 10 further comprises a first side cover 7 and a second side cover 8.

Figure 3:
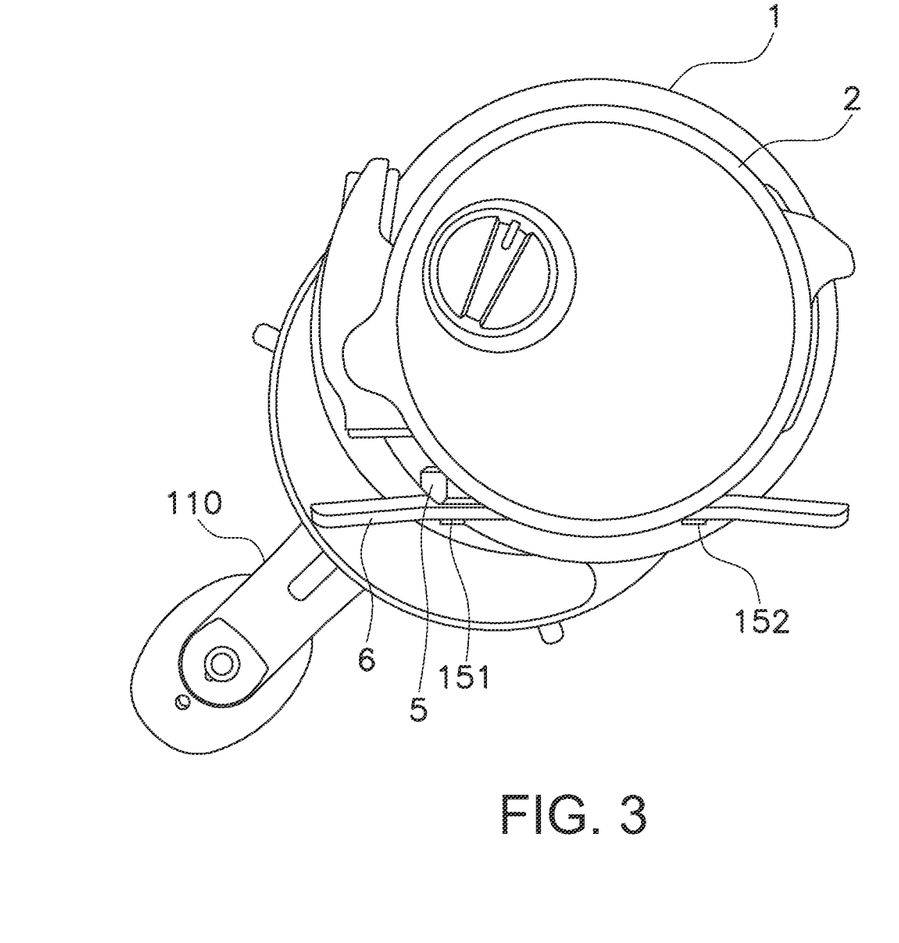
FIG. 3 is aside view of the dual-bearing reel.

The first body portion 1 and the second body portion 2 are disposed to face each other at an interval. As shown in FIG. 3, the first body portion 1 is formed in an essentially circular shape from the side view and is larger in diameter than the second body portion 2. Meanwhile, FIG. 3 is a side view of the dual-bearing reel.

As shown in FIG. 2, the side surface of the first body portion 1 (the left side surface in FIG. 2) is open, and the opening is closed by the first side cover 7. Meanwhile, the first side cover 7 is formed in the shape of two, partially overlapping circles from the side view. The rotation transmission mechanism 140, etc. are housed in a first internal space 11 that is formed by the first body portion 1 and the first side cover 7.

As shown in FIG. 3, the second body portion 2 is formed in an essentially circular shape from the side view and is smaller in diameter than the first body portion 1. As shown in FIG. 2, the side surface of the second body portion 2 (the right side surface in FIG. 2 is open, and the opening is closed by the second side cover 8. A centrifugal braking mechanism not shown) for preventing backlash, etc. is housed in a second internal space 21 that is formed by the second body portion 2 and the second side cover 8.

As shown in FIG. 1 and FIG. 2, the connecting unit 3 couples the first body portion 1 and the second body portion 2. The connecting unit 3 comprises a first connecting portion 31 and a second connecting portion 32. The first connecting portion 31 and the second connecting portion 32 are disposed at an interval from each other in the longitudinal direction.

The first connecting portion 31 connects the first body portion 1 and the second body portion 2. The first connecting portion 31 extends between the first body portion 1 and the second body portion 2. That is, the first connecting portion 31 extends in a direction that intersects with the fishing rod mounting portion 6.

The first connecting portion 31 is integrally formed with the first body portion 1 and the second body portion 2. As shown in FIG. 2 and FIG. 3, the first connecting portion 31 is positioned inside of the outer peripheral edge of the second body portion 2 from the side view. That is, as shown in FIG. 3, the first connecting portion 31 is disposed in a position that overlaps with the second body portion 2 from the side view.

As shown in FIG. 2, the second connecting portion 32 couples the first body portion 1 and the second body portion 2. The second connecting portion 32 extends between the first body portion 1 and the second body portion 2. That is, the second connecting portion 32 extends essentially parallel to the first connecting portion 31 in a direction that intersects with the fishing rod mounting portion 6. The second connecting portion 32 is disposed at an interval with the first connecting portion 31 in the longitudinal direction. Specifically, the second connecting portion 32 is disposed behind the first connecting portion 31.

The second connecting portion 32 is integrally formed with the first body portion 1 and the second body portion 2. As shown in FIG. 2 and FIG. 3, the second connecting portion 32 is positioned inside of the outer peripheral edge of the second body portion 2 from the side view. That is, as shown in FIG. 3, the second connecting portion 32 is disposed in a position that overlaps with the second body portion 2 from the side view.

As shown in FIG. 1 and FIG. 2, the fixing portion 5 is disposed on the connecting unit 3. Specifically, the fixing portion 5 is disposed on the first connecting portion 31. As shown in FIG. 3, the fixing portion 5 protrudes from the outer peripheral edge of the second body portion 2 from the side view. That is, at least one portion of the fixing portion 5 is positioned outside of the outer peripheral edge of the second body portion 2. Specifically, the fixing portion 5 protrudes forward from the outer peripheral edge of the second body portion 2 from the side view.

As shown in FIG. 1 and FIG. 2, the fixing portion 5 protrudes forward from the center portion of the first connecting portion 31 in the longitudinal direction. As shown in FIG. 3, the fixing portion 5 is positioned inside of the outer peripheral edge of the first body portion 1 from the side view and at least one portion of the fixing portion 5 is positioned outside of the outer peripheral edge of the second body portion 2 from the side view.

As shown in FIG. 2, the fishing rod mounting portion 6 is configured to be mounted to a fishing rod. The fishing rod mounting portion 6 extends in the longitudinal direction. The fishing rod mounting portion 6 is fixed to the fixing portion 5 and the second connecting portion 32. Specifically, the fishing rod mounting portion 6 is fixed to the fixing portion 5 by a first rivet 151 and is fixed to the second connecting portion 32 by a second rivet 152. The front end and the rear end of the fishing rod mounting portion 6 are mounted to the fishing rod.

As shown in FIG. 2, the handle 110 is rotatably mounted to the outer surface of the reel body 10. The spool 120 and the level winding mechanism 130 are driven via the rotation transmission mechanism 140, by rotating the handle 110.

The rotation transmission mechanism 140 is a mechanism for transmitting the rotation of the handle 110 to the spool 120 and the level winding mechanism 130. The rotation transmission mechanism 140 is disposed inside of the first internal space 11. The rotation transmission mechanism 140 comprises a drive shaft 141, a drive gear 142, a pinion gear (not shown), and a first gear 143.

The drive shaft 141 is coupled with the handle 110 and integrally rotates with the handle 110. Further, the drive shaft 141 is prevented from rotating in the line delivering direction by a one-way clutch 144. The drive gear 142 is mounted to the drive shaft 141 and integrally rotates with the drive shaft 141. The pinion gear meshes with the drive gear 142. The pinion gear is a tubular shape. The first gear 143 is mounted to the drive shaft 141 and integrally rotates with the drive shaft 141.

As shown in FIG. 1, the spool 120 is disposed between the first body portion 1 and the second body portion 2. A fishing line is wound on the outer peripheral surface of the spool 120. The spool 120 is fixed to a spool shaft 121 and integrally rotates with the spool shaft 121. Additionally, the spool shaft 121 extends between the first body portion 1 and the second body portion 2. The spool shaft 121 is rotatably supported by the first and the second body portions 1 and 2 via an axle bearing member, etc. Moreover, the spool shaft 121 is integrally rotatable with the pinion gear.

The level winding mechanism 130 is a mechanism for evenly winding a fishing line on the spool 120. The level winding mechanism 130 comprises a worm shaft (not shown), a guide member 131, and a sliding member 132.

The worm shaft extends between the first body portion 1 and the second body portion 2. A second gear (not shown)

that meshes with the first gear 143 is mounted to the end of the worm shaft. Accordingly, the worm shaft rotates in conjunction with the rotation of the handle 110. A tubular guide member 131 is also disposed so as to cover the worm shaft. The sliding member 132 reciprocally moves along the guide member 131 in conjunction with the rotation of the worm shaft.

Characteristics

The reel body 10 of the dual-bearing reel 100 according to the present embodiment has the following characteristics.

The reel body 10 of the dual-bearing reel 100 according to the present embodiment casts a fishing line in a forward direction. The reel body 10 comprises a first body portion 1, a second body portion 2, a connecting unit 3, a fixing portion 5, and a fishing rod mounting portion 6. The first body portion 1 and the second body portion 2 are disposed to face each other at a prescribed interval. The outer shapes of the first body portion 1 and the second body portion 2 are circular from the side view. The connecting unit 3 connects the first body portion 1 and the second body portion 2. The fixing portion 5 is disposed on the connecting unit 3. Specifically, this fixing portion is disposed on the first connecting portion 31. The fixing portion 5 protrudes from the outer peripheral edge of the second body portion 2 from the side view. The fishing rod mounting portion 6 is configured to be mounted to a fishing rod. The fishing rod mounting portion 6 is fixed to the fixing portion 5.

According to this configuration, the fixing portion 5, to which the fishing rod mounting portion 6 is fixed, is configured to protrude from the outer peripheral edge of the second body portion 2. Accordingly, the distance between the distal end of the fishing rod mounting portion 6 and the first rivet 151 can be shortened. As a result, the moment that acts on the fishing rod mounting portion 6 when reeling in a fish, etc. can be reduced; thus, preventing bending the fishing rod mounting portion 6.

MODIFIED EXAMPLE

Although embodiments of the present invention have been set forth above, the present invention is not limited to these embodiments, and various modifications can be made without departing from the scope of the invention.

Modified Example 1

In the above-described embodiment, the fixing portion 5 is positioned inside of the outer peripheral edge of the first body portion 1, but the configuration is not particularly limited to this configuration. For example, the fixing portion 5 can be positioned outside of the outer peripheral edge of the first body portion 1.

Modified Example 2

The fishing rod mounting portion 6 is fixed to the fixing portion 5 by the first rivet 151, but the configuration is not particularly limited to this configuration. For example, the fishing rod mounting portion 6 can be fixed to the fixing portion 5 by another fixing means or device, such as a bolt or welding.

Modified Example 3

In the above-described embodiment, the connecting unit 3 is configured by two connecting portions, the first connecting portion 31 and the second connecting portion 32; however, the configuration is not particularly limited to this configuration. For example, the connecting unit 3 can be formed by one connecting portion in which the first connecting portion 31 and the second connecting portion 32 are integrally formed.

Modified Example 4

In the above-described embodiment, the connecting unit 3 is formed by two connecting portions, the first connecting portion 31, to which is disposed a fixing portion 5 that is positioned outside of the outer peripheral edge of the second body portion 2, and the second connecting portion 32 from the side view; the first connecting portion 31 and the second connecting portion 32 are both positioned inside of the outer peripheral edge of the second body portion 2 from the side view; however, but the configuration is not particularly limited to this. That is, only at least the first connecting portion 31, to which is provided the fixing portion 5, needs to be positioned inside of the outer peripheral edge of the second body portion 2; the second connecting portion 32, to which is not provided the fixing portion 5, can be positioned outside of the outer peripheral edge of the second body portion 2.

Modified Example 5

Figure 4:
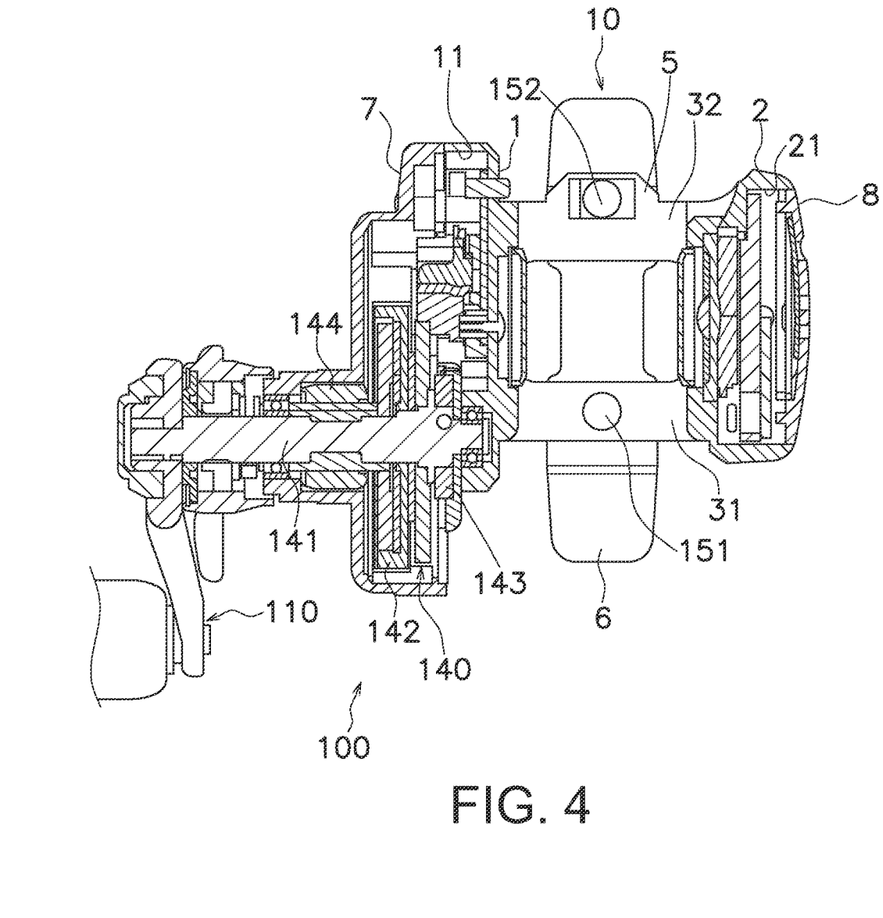
FIG. 4 is a cross-sectional view of a dual-bearing reel according to a third modified example.
Figure 5:
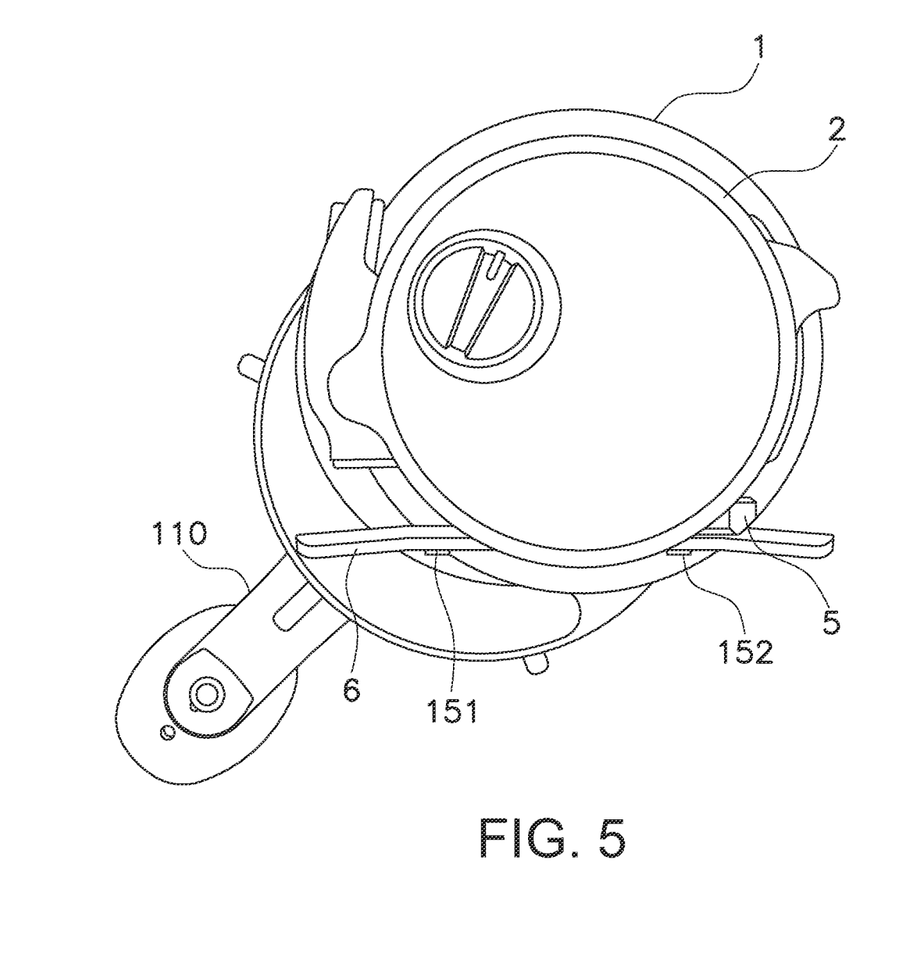
FIG. 5 is a side view of the dual-bearing reel according to the third modified example.

In the above-described embodiment, the fixing portion 5 is disposed on the first connecting portion 31, but the configuration is not particularly limited to this structure. For example, as shown in FIG. 4, the fixing portion 5 can be disposed on the second connecting portion 32. In particular, the fixing portion can be configured to protrude rearward from the second connecting portion 32. In this configuration, as shown in FIG. 5, the fixing portion 5 protrudes outside of the outer peripheral edge of the second body portion 2. That is, the fixing portion 5 protrudes rearward from the outer peripheral edge of the second body portion 2.

Modified Example 6

Figure 6:
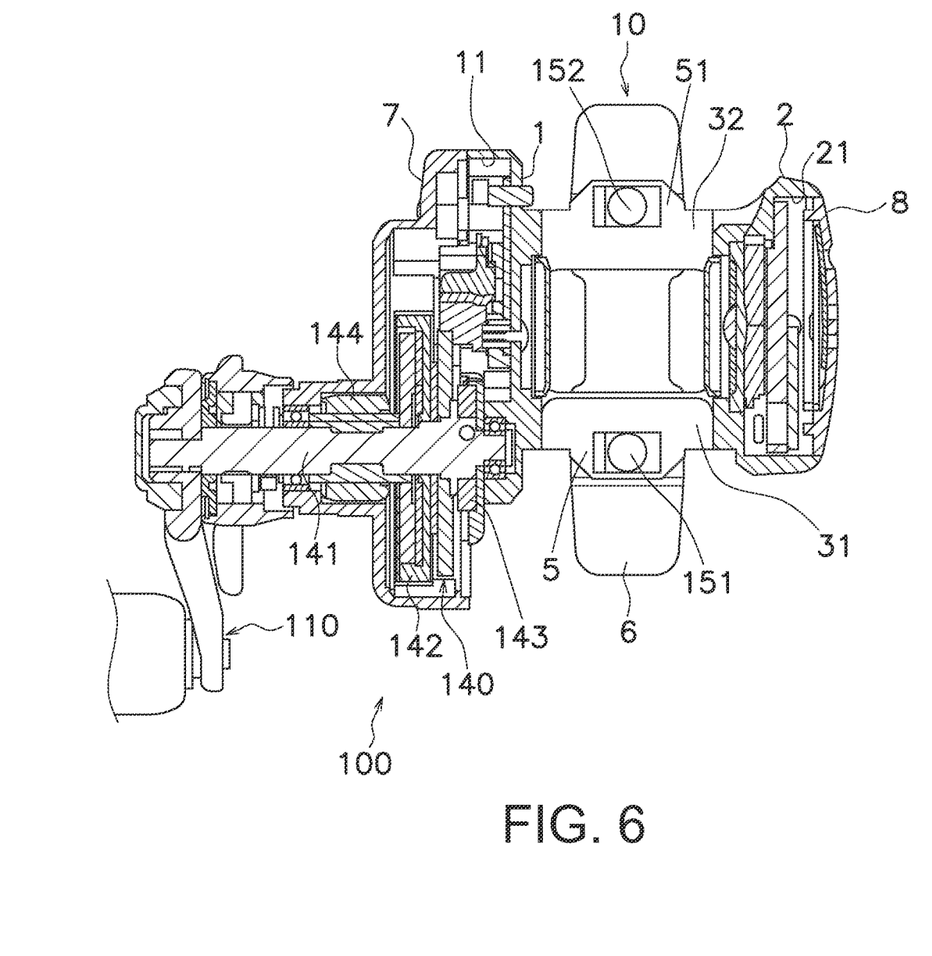
FIG. 6 is a cross-sectional view of a dual-bearing reel according to a fourth modified example.
Figure 7:
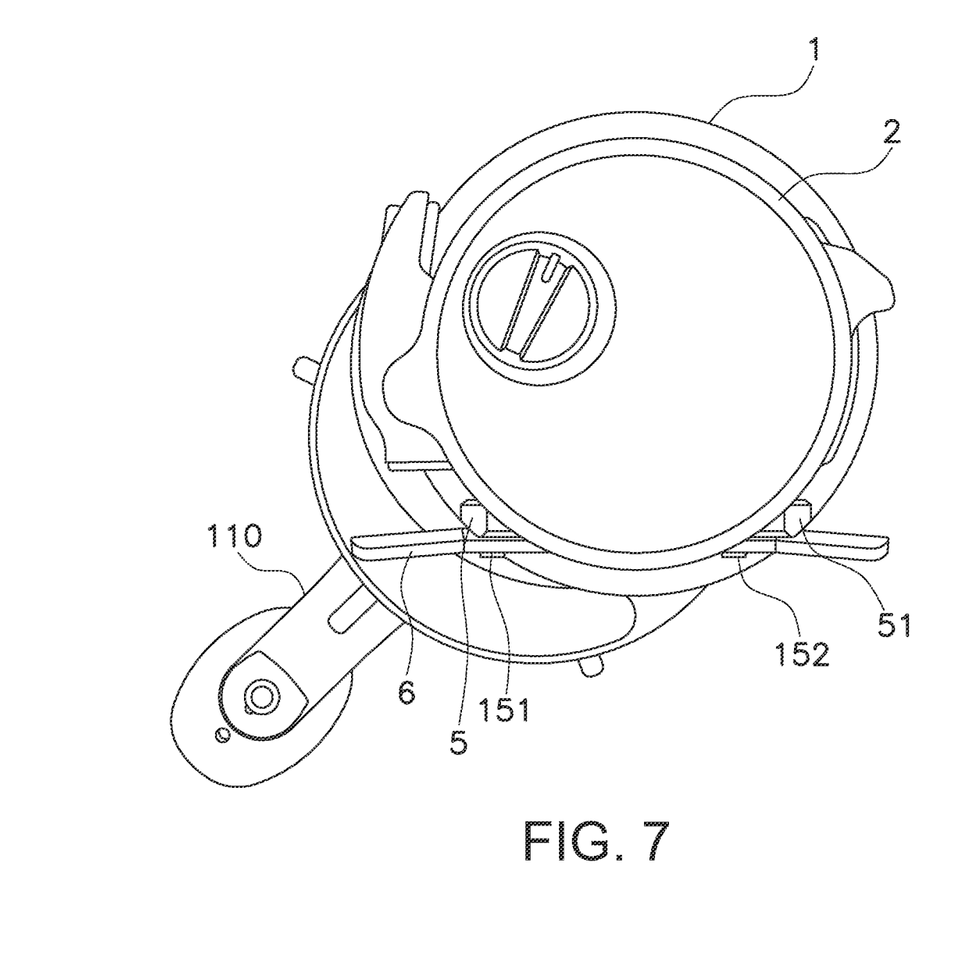
FIG. 7 is a side view of the dual-bearing reel according to t e fourth modified example.

In the above-described embodiment, the fixing portion 5 is disposed only on the first connecting portion 31, but the configuration is not particularly limited to this configuration. For example, as shown in FIG. 6, a fixing portion 51 can also be disposed on the second connecting portion 32. In this configuration, the fixing portion 51 disposed on the second connecting portion 32 protrudes rearward. Additionally, as shown in FIG. 7, both the first connecting portion 31 and the second connecting portion 32 are positioned inside of the outer peripheral edge of the second body portion 2 from the side view; the fixing portions 5 and 51 both protrude outside (forward or rearward) of the outer peripheral edge of the second body portion 2.

What is claimed is:

1. A reel body of a dual-bearing reel for casting a fishing line in a forward direction, comprising:
   a first body portion;
   a second body portion disposed to face the first body portion at a prescribed interval, an outer shape of at least one of the first and second body portions being circular or substantially circular from a side view;
   a connecting unit coupling the first body portion and the second body portion;
   a fixing portion disposed on the connecting unit and protruding beyond an outer peripheral edge of at least one of the first body portion and the second body portion from the side view; and a fishing rod mounting portion configured to be mounted to a fishing rod and being directly fixed to the fixing portion.

2. The reel body of the dual-bearing reel recited in claim 1, wherein the fixing portion protrudes forward from an outer peripheral edge of at least one of the first body portion and the second body portion from the side view.

3. The reel body of the dual-bearing reel recited in claim 1, wherein the fishing rod mounting portion extends in a longitudinal direction;

the connecting unit extends in a direction that intersects the fishing rod mounting portion, and the fixing portion protrudes from a center portion of the connecting unit in the longitudinal direction.

4. The reel body of the dual-bearing reel recited in claim 1, wherein the fishing rod mounting portion is fixed to the fixing portion by a rivet.

5. The reel body of the dual-bearing reel recited in claim 1, wherein the first body portion has a diameter that is larger than a diameter of the second body portion, and the fixing portion is positioned inside of an outer peripheral edge of the first body portion and is positioned outside of an outer peripheral edge of the second body portion from the side view.

6. The reel body of the dual-bearing reel recited in claim 1, wherein the connecting unit is positioned inside of an outer peripheral edge of the first and the second body portions from the side view.

7. The reel body of the dual-bearing reel recited in claim 1, wherein the connecting unit comprises a first connecting portion and a second connecting portion disposed at an interval with the first connecting portion in the longitudinal direction, and the first and second connecting portions coupling the first body portion and the second body portion.

8. The reel body of the dual-bearing reel recited in claim 7, wherein the fishing rod mounting portion is fixed to the fixing portion and the second connecting portion.

9. The reel body of the dual-bead ng reel recited in claim 7, wherein the first connecting portion and the second connecting portion are positioned inside of an outer peripheral edge of the first and the second body portions from the side view.

* * * * *